United States Patent [19]

Suhre

[11] Patent Number: 4,656,639

[45] Date of Patent: Apr. 7, 1987

[54] LASER GENERATING APPARATUS UTILIZING FREQUENCY AGILE UNSTABLE RESONATOR LOW PRESSURE GAIN CELL AND TUNING MEANS

[75] Inventor: Dennis R. Suhre, Monroeville Boro, Pa.

[73] Assignee: Westinghouse Electric Corp., Pittsburgh, Pa.

[21] Appl. No.: 788,302

[22] Filed: Oct. 17, 1985

[51] Int. Cl.⁴ .............................................. H01S 3/097
[52] U.S. Cl. ..................................................... 372/83
[58] Field of Search ......................... 372/81, 83, 80, 84

[56] References Cited

U.S. PATENT DOCUMENTS 4,542,529  9/1985  Pace et al. ............................. 372/83

Primary Examiner—Gene Wan
Attorney, Agent, or Firm—W. G. Sutcliff

[57] ABSTRACT

An infrared laser energy generating apparatus, specifically a transverse excited atmospheric (TEA) laser generating apparatus incorporating a low pressure gain cell and tunable reflecting means to eliminate mode-beating and gain-spiking of the laser beam, to select a given lasing transition, and to accomplish this selection and filtering of a high power, large diameter laser beam using smaller diameter optical components.

10 Claims, 4 Drawing Figures

LASER GENERATING APPARATUS UTILIZING FREQUENCY AGILE UNSTABLE RESONATOR LOW PRESSURE GAIN CELL AND TUNING MEANS

BACKGROUND OF THE INVENTION

1. Field of the Invention

The present invention relates to an infrared laser energy generating transversely excited atmospheric (TEA) laser generating apparatus incorporating a low pressure gain cell and tuning means to tune and filter the laser energy output thereby eliminating gain-spiking and mode-beating.

2. Description of the Prior Art

A transversely excited atmospheric (TEA) laser energy generating apparatus can be described as an enclosed chamber or envelope containing a gaseous predetermined mixture exposed to an electrical discharge creating laser energy. The laser energy is reflected between a multiplicity of reflective means converting the energy into a laser beam.

The U.S. Pat. No. 4,127,826 dated Nov. 28, 1978 to Charles M. Cason III teaches a laser system utilzing a helium neon laser for transmitting a beam through a dichroic lens into an unstable resonator. A second laser, a carbon dioxide laser, has a beam transmitted through the dichroic to follow the helium neon beam into the unstable resonator whereby the resonator secondary and primary mirrors are adjusted into a parallel orientation. The gain-spike is therefore suppressed eliminating air breakdown.

U.S. Pat. No. 4,352,562 dated Oct. 5, 1982 entitled "Passive Ring Laser Rate of Turn Device with Acousto-Optic Modulation" teaches a ring resonator wherein the frequency of the laser beam is altered by passing the beam through an acousto-optic filter. The acousto-optic modulation is capable of modulating the laser at frequencies well up into the radio frequency range as is required for cavity stabilization.

U.S. Pat. No. 4,361,889 dated Nov. 30, 1982 utilizes the ring configuration of an array of four reflectors for a narrow line carbon dioxide pump laser wherein the spherical and planar wavefronts are separated from each other along separte opitcal paths and only the planar wavefront is impinged on a plane grating for fine tuning. This plane grating on the output axis is oriented to reflect a portion of the output beam off axis onto a planar relay mirror spaced apart from the output axis in proximity to the concave mirror. The relay mirror reflects plane waves from the grating to impinge on a convex expanding mirror spaced apart from the output axis in the proximity of this grating. Tuning is provided for by rotating the plane grating about an axis normal to the output axis.

SUMMARY OF THE INVENTION

FIG. 1 shows an unstable resonator or a combination of the discharge chamber, concave and/or convex mirrors coupling energy from a laser discharge. An aperture is drilled in the mirror farthest from the output window. The purpose of this aperture is to allow a fraction of the laser energy to propagate through the low pressure gain cell located immediately behind the apertured mirror. In this embodiment, FIG. 1 the gain cell contains the same composition of gases as in the primary envelope or discharge chamber. And, the gain cell is located immediately behind a concave mirror. The inherent properties of the low pressure gain cell, result in the production of a dominant gain which will filter incoming reflected laser energy elmininating gain-spiking and node-beating.

The proposed invention utilzies only the small fraction of the laser energy propagated through the gain cell to achieve mode control. The laser energy gain comprises resonator modes, which all uniformly separated in frequency; and molecular transitions which will usually have a greater frequency width than the mode spacing. If there is no mode control, then several resonator modes can sum together to proudce high energy spikes which will cause atmospheric ionization and damage to the optical lenses and mirrors.

In the preferred embodiment of this invention molecular transitions are modulated by a tuning means incorporated into the laser generating apparatus directly behind and on the same optical axis as the low pressure gain cell. The lower pressure gain cell will operate to select one resonator mode to serve as the dominant gain mode for the laser energy flowing through the apertured mirror.

This invention comprises a primary envelope wherein a controlled predetermined gaseous environment comprising carbon dioxide and other gases such as helium and nitrogen are exposed to an electrical discharge, from parallel electrodes. This electrical discharge excites the gaseous environment resulting in laser excitation between the parallel electrodes. The gaseous environment is maintained at approximately one atmosphere or 760 Torr in this chamber. The predetermined composition of the environment would be, for example, ten percent carbon dioxide, fort percent nitrogen and fifty percent helium. Situated opposing each other and at the ends of these electrodes are two reflective means. These reflective means, for example, convex or concave mirrors, serve to redirect the laser energy generated between the parallel electrodes between each other. The first reflecting means or first convex mirror is located at one end of the parallel electrodes and before the output or window means. The second reflecting means or concave mirror is situated directly opposite on the same optical axis of the first reflecting mirror or convex mirror and also serves to reflect this laser energy back towards the first reflecting mirror. Situated at a point on the same optical axis but directly behind the concave or second reflecting mirror is a low pressure gain cell. The low pressure gain cell is an enclosed small, elongated envelope which contains a gaseous environment of predetermined composition, principally the same composition as the gaseous environment of the primary envelope. Further, the gaseous environment is maintained at a pressure less than the pressure of the gaseous environment of the primary envelope. The pressure of the gas in the low pressure gain cell is approximatley 20 Torr as compared to 760 Torr in the gaseous environment of the changer. Electrodes positioned parallel to each other and at opposite ends of this low pressure gain cell provide an initial low pressure gain cell discharge which will produce a gain within the small, elongated low pressure gain cell envelope means. In the preferred embodiment of this invention, the low pressure gain cell envelope would experience this discharge prior to the discharge within the primary envelope. Upon the electrical discharge within the primary envelope, a portion of the generated laser energy will pass through an aperture which must be in the second reflecting means. This aperture which is on the same optical axis as the window means, the first reflecting means, second reflecting means and low pressure gain cell means, will permit a portion of the laser energy to pass through the aperture into the low pressure gain cell means. The low pressure gain cell means will select one resonator mode from within the many possible modes determined by the gain of the high pressure gaseous medium that has been electrically stimulated. Further, on the same optical axis and directly behind the low pressure gain cell would be a reflecting means. This reflecting means, should it be a mirror, would reflect and cause amplification of the laser energy of the highest gain molecular transition, and this reflecting means would further reflect the laser energy of that highest gain molecular transition back through the low pressure gain cell and then back through the aperture within the second reflecting means, and the signal would be further issued back into the electrical discharge chamber, setting up a laser resonator mode. Part of the signal issued back into the primary electrical discharge chamber would then reflect back and forth between the convex and the concave mirrors receiving increase in power until it spills over around the first reflecting means and out through the window means. The high powered laser beam energy generated would result in an annular beam.

Another embodiment of this invention would utilize in place of the reflecting means behind the low pressure gain cell a tuning means. This tuning means could be an acousto-optic filter or a grating. A grating is nothing more than a mirror which has been selectively scored so that only the laser energy of one molecular transition would be reflected back through the low pressure gain cell means. An acousto-optic filter would also be appropriately tuned to reflect only the laser energy of one molecular transition through the tuning means back through the low pressure gain cell, back through the aperture in one of the reflective means into the discharge chamber.

The disclosed transverse excited atmosphere laser generating apparatus would require high voltage, for example, approximately 200,000 volts electrical discharge for a large device in a gaseous environment of predominantly carbon dioxide and other gases (nitrogen and helium) at approximately one atmosphere. A low pressure gain cell gaseous environment of less than one atmosphere also principally comprises carbon dioxide and other gases. The convex and concave reflective means would be reflecting mirrors whereby the first reflecting means would be convex and of a smaller diameter than the second reflecting means and the second reflecting means would be concave and apertured. The electrodes in one embodiment, though parallel, need not be rectangular and planar but could be of a square configuration or geometry. The window means whereby the modulated, tuned beam issued outside of the primary envelope would be in one embodiment, sodium chloride. The reflecting means located at a position behind the low pressure gain cell envelope and the mirror, would be a concave mirror. A tuning means could be an acousto-optic filter or a fine line grating.

BRIEF DESCRIPTION OF THE DRAWINGS

For a better understanding of the invention, reference may be had of the preferred embodiment exemplary of the invention shown in the accompanying drawings in which.

DESCRIPTION OF THE PREFERRED EMBODIMENT

Figure 1:
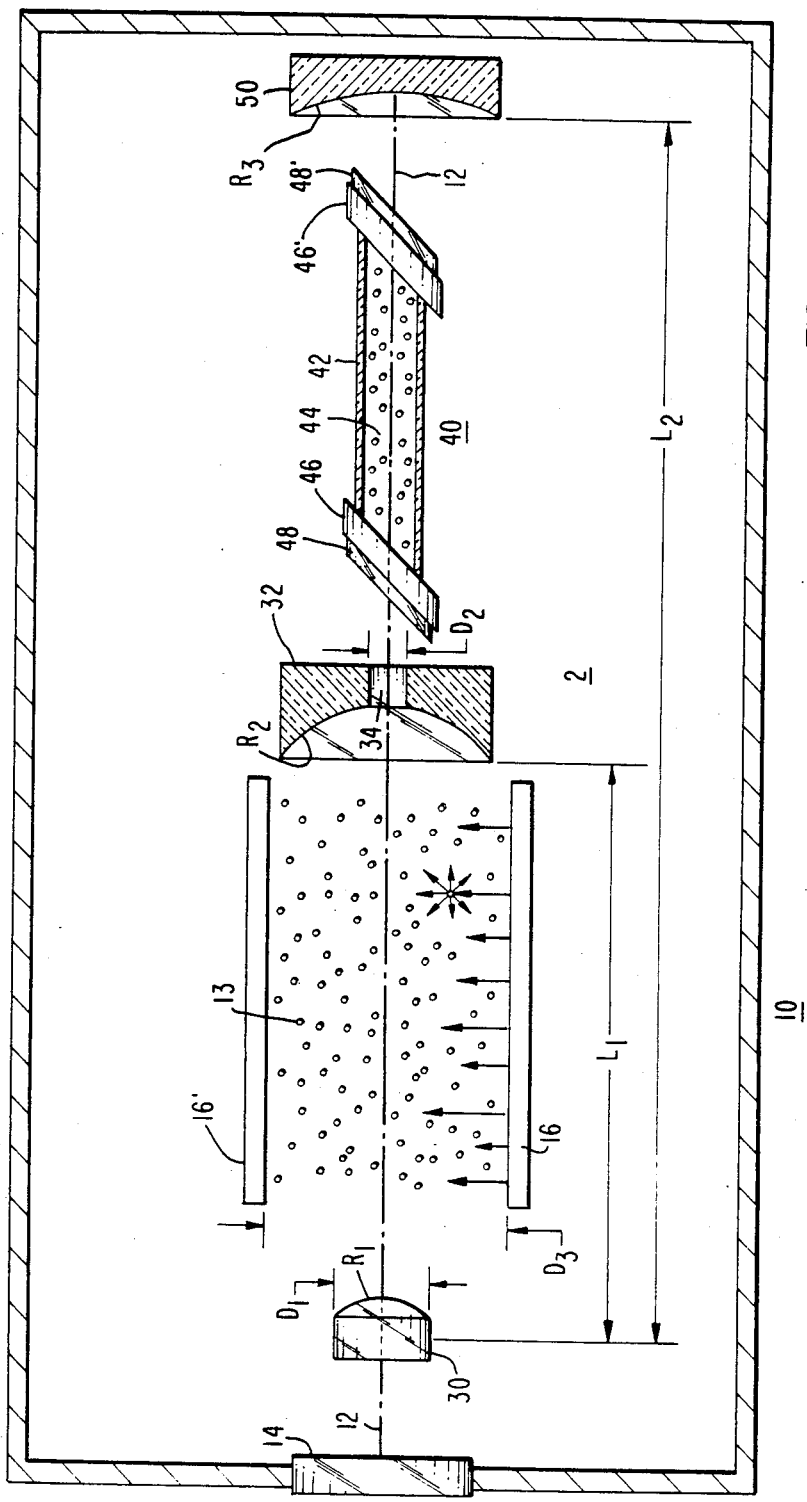
FIG. 1 is a schematic elevational view of the laser energy generating apparatus indicating distances, lengths and radius of curvature for the critical elements.

FIG. 1 shows the laser generating apparatus 2. A sealed primary envelope means 10 has an optical axis 12 enclosing a predetermined gaseous mixture 13. This gaseous mixture 13 comprises carbon dioxide and other gases such as nitrogen and helium at about atmospheric pressure. A radiation transmitting window 14 such as sodium chloride is located proximate one end of this sealed primary envelope means 10. Spaced high voltage electrodes 16 and 16' are positioned within said primary envelope means 10, generally paralleling and about the optical axis 12 of the primary envelope means 10 and spaced apart a predetermined distance $D_3$. Electrodes 16 and 16' are operable to produce between them an electric discharge 20. This electric discharge 20 further comprises a substantial number of lasing transitions 22 (see FIG. 2). These transitions have different optical gains which are characteristic of this discharge 20 produced in the predetermined gaseous mixture 13. A first reflective means 30 of predetermined relatively small peripheral diameter $D_1$, is positioned upon the optical axis 12 of primary envelope means 10 at a location proximate the ends of the electrodes 16 and 16' which are located nearest the window means 14. This first reflective means 30, has a predetermined radius of curvature $R_1$ and the second reflective means 32 is of a predetermined large diameter relative to the first reflective means 30. The second reflective means 32 has a predetermined radius of curvature $R_2$ and both reflectors are positioned upon the optical axis 12 of the primary envelope means 10 and in a position proximate the ends of the electrodes 16 and 16'. In this embodiment the first reflective means 30 is a convex mirror while the second reflective means 32 is a concave mirror. An aperture 34 of a predetermined diameter $D_2$ is provided through the second reflective means 32 and coincident with the optical axis 12 of the primary envelope means 10. These first reflective means 30 and second reflective means 32 are both operable to reflect and amplify the lasting transitions 22.

A gain cell means 40 is enclosed within said primary envelope means 10. Gain cell means 40 comprises a small elongated envelope 42 which is aligned with the optical axis 12 of the primary envelope means 10 and positioned on the opposite side of the second reflective means 32 from the spaced electrodes 16 and 16'. The gain cell 40 encloses a gaseous predetermined atmosphere of a similar composition as the atmosphere in the primary envelope means 10; however, this gaseous predetermined compositon is at a low pressure or lower pressure than the gaseous mixture encompassed by the low primary envelope 10. Two hollow spaced electrodes 46 and 46' are positioned proximate the ends of this small envelope 42. Radiation transmitting window means 48 and 48' are positioned at the ends of envelope 42 and comprise zinc selenide.

An incipient lasing effect 24 (see FIG. 2) is produced by the multiple reflections of the lasing transitions 22 between the between the first reflective means 30 and a reflecting means 50. The lasing transitions 22 thus pass longitudinally through the gain cell means 40, and this gain cell means 40 is operated as a selective filter to pass only a predetermined limited portion of the resonator modes 26 which are a part of the incipient lasing effect 24 (see FIG. 2). The reflecting means 50 is positioned within the primary envelope means 10 and aligned with the optical axis 12 of the primary envelope means 10 and with the gain cell means 40 and is positioned on the opposite side of the gain cell means 40 from the second reflective means 32. This reflecting means 50 is operable to receive and reflect the lasing transitions 22 which pass through the gain cell means 40. These lasing transitions 22 reflected from the reflecting means 50 then pass again through the gain cell means 40 and then through the aperture 34 of the second reflective means 32 and thence through the electric discharge 20 where these lasing transitions 22 and the resonator modes 26 pass by the gain cell means 40 are further amplified by multiple reflections between the first reflective means 30 and the second reflective means 32 to form a laser beam 28 (see FIG. 2). This laser beam 28 comprises a discrete lasing transition and a discrete resonator mode which is ultimately passed through the periphery of the first reflective means 30 and through the window means means 14 out of the primary envelope means 10.

There are relative critical dimensions which are necessary in order to achieve the modulated frequency tuned signal in the laser beam 28. In FIG. 1, $L_1$ is the amplifier length between reflective means 30 an 32. It is essentially an arbitrary number and it depends upon the required output energy and gain of the gaseous medium 13. $L_2$ is the resonator length and it again is arbitrary and should be long enough to accommodate the low pressure gain cell envelope 42. $D_3$ is the electrode separation. This again is arbitrary and is determiend by the required output energy and defines the dimensions of the gain region itself. Two other independent variables are not shown on the figures but are of merit, m is the magnification of the amplifier and is arbitrary and is determined by the gain of the gaseous medium 13 and the gain medium length, and N is the number of radiation round trips through the amplifier region, which is again arbitrary but should be small enough to prevent self-oscillation within the amplifier length $L_1$. Given these five independent variables, one can then make a determination of what one would call the five critical dependent variables. These variables are $R_1$ which is the radius of cruvature of the first reflective means 30, $R_2$ which is the radius of curvature of the second reflective means 32, $R_3$ which is the radius of curvature of the reflective means 50, $D_1$ which is the diameter of the first reflective means 30 and $D_2$ which is the diameter of the aperture within the second reflective means 32. In order to determine the dependent variable $R_1$, $R_2$, $R_3$, $D_2$ and $D_3$ it is necessary to utilize the following relationships:

$$R_1 = (-2L_1)/(m-1)$$

$$R_2 = (2mL_1)/(m-1)$$

$$R_3 = 2L_2 + (2L_1)/(m-1)$$

$$D_1 = D_3/m$$

$$D_2 = D_3/Nm$$

Figure 2:
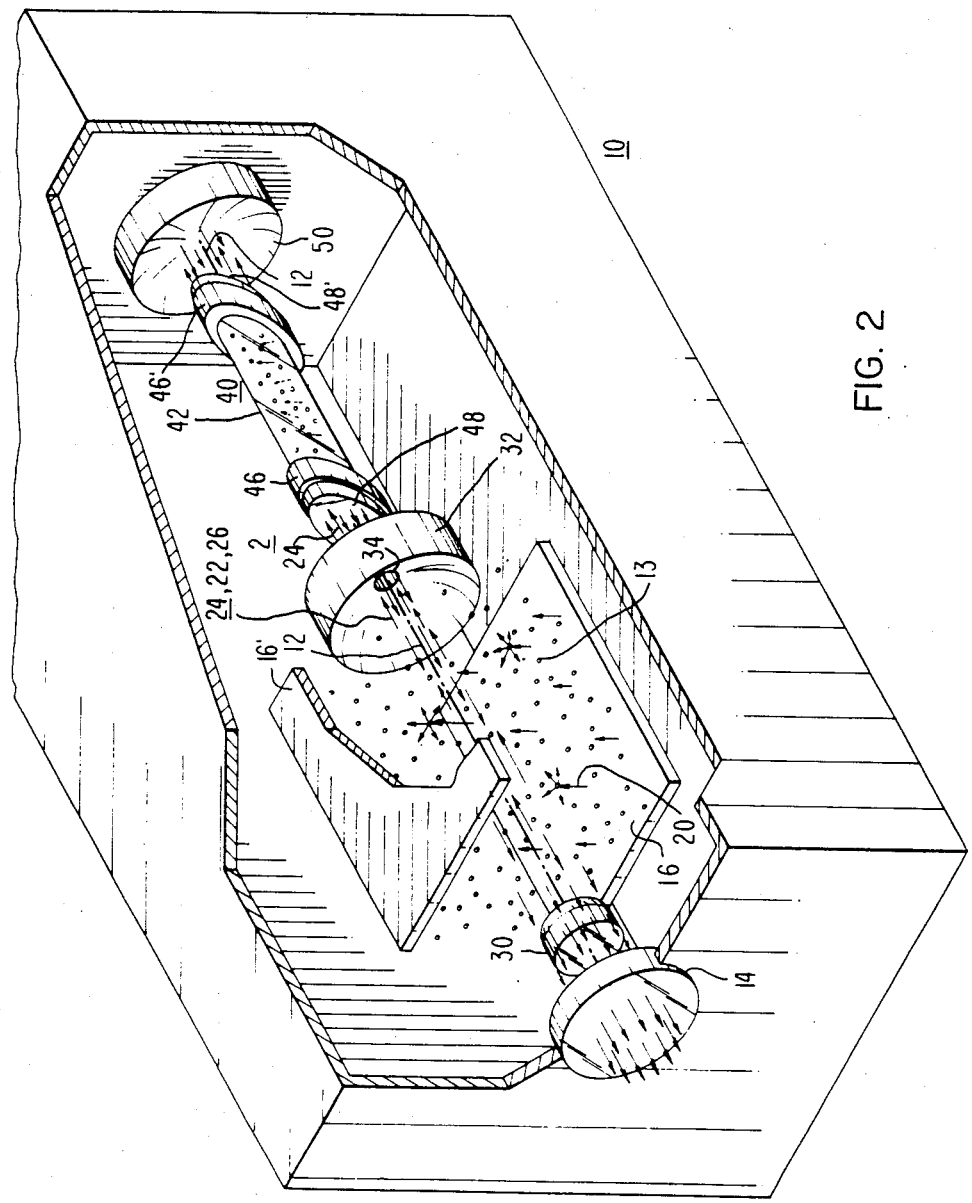
FIG. 2 is a schematic isometric view of the individual elements comprising the laser energy generating apparatus at the initial energy discharge stage, and through the emission of laser generated energy.

FIG. 2 is schematic isometric view of the laser generating apparatus 2. The primary envelope means 10 encloses the resonator porition which is comprised of the first reflective means 30, the parallel high voltage electrodes 16 and 16', and the second reflective means 32. Aperture 34 permits the passing of a portion of the laser energy created by electrical discharge 20 which will occur between the parallel electrodes 16 and 16'.

A low pressure gain cell 40 which further comprises an envelope 42 containing a predetermined gaseous mixture 41 with two parallel electrodes 46 and 46' is operable to generate a discharge 43 prior to the initial electrical discharge 20 which will occur between two electrical electrodes in the primary envelope 10. A reflecting means 50 is positioned on the optical axis with the low pressure gain cell 40, the second reflecting means 32 and the first reflecting means 30 to provide a generation of the laser beam 28 which passes through the window means 14 of the primary envelope 10.

The beam which is reflected back through the low pressure gain cell 40 by the reflecting means 50 now comprises only one lasing transition 22 and only one resonator mode 26. It is this beam that then passes through the reflecting means 32 via the aperture 34 into the area of electrical discharge 20 which is between the two parallel electrodes 16 and 16'. The laser energy produced within the area of the electrical discharge 20 between the two parallel electrodes 16 and 16' within the gaseous predetermined compositon of 13 is then reflected between the first reflective means 30 and the second reflective means 32. This multiplicity of reflections between 30 and 32 generate the beam of the laser energy of a single lasing transition 22 and single resonator mode 27 and the power and amplification of the beam increases in intensity until the intense beam spills around the first reflective means 30 which has a smaller peripheral diameter than the window means 14 so that the laser beam 28 issues from the window means 14.

Figure 3:
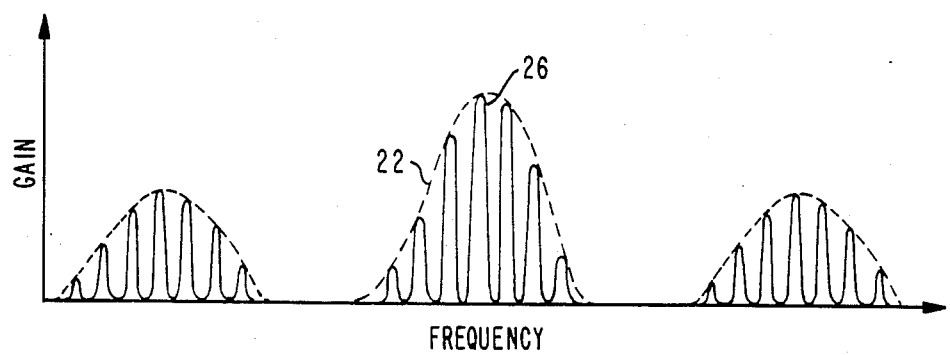
FIG. 3 is a graph of gain versus frequency of the laser energy generated after the initial energy discharge state during the reflection between first and second reflective means.

FIG. 3 is a graph which shows the relationship between gain and frequency of the incipient lasing effect 24. The incipient lasing effect is comprised of lasing transitions 22 and they are further comprised of multiplicity of resonator modes 26. Gain is related to the amplitude of the incipient lasing effect.

Figure 4:
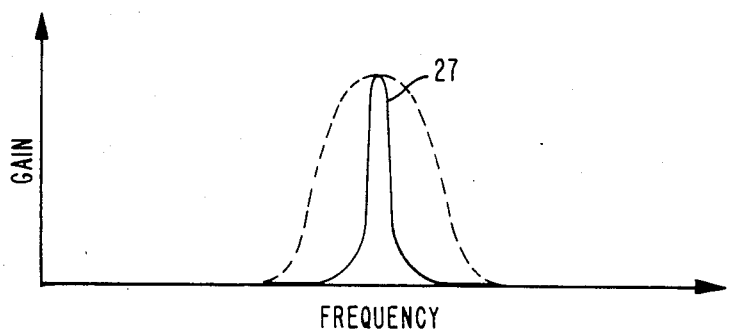
FIG. 4 is graph of the specific modular transition and resonator modes selected by the low pressure gain cell means and tuning means.

FIG. 4 shows a graph of the comparison of gain versus frequency with the incipient lasing effect 24 after the tuning and selection process. As shown, the multiplicity of resonator modes 26 incorporated under the lasing transitions 22 wil be narrowed by the low pressure gain cell 40 to a single resonator mode 27 within the lasing transitions 22. The portion of the incipient lasing effect 28 is then the laser beam which issues forth around the first reflective means 30 through the window means 14 of the primary envelope means 10 of the laser generating apparatus 2.

Numerous drawings shall be interpreted as illustrative and not in a limiting sense. Variations may be made in the above described combination and different embodiments of this invention may be made without departing from the spirit thereof. Therefore, it is intended that all matter contained in the foregoing description and in the accompanying drawings shall be interpreted as illustrative and not in a limiting sense.

We claim:

1. An infrared-generating tuned transverse excited atmospheric (TEA) laser-energy-generating apparatus comprising:

a sealed primary envelope means having an optical axis and enclosing a predetermined gaseous mixture, said gaseous mixture comprising carbon dioxide and other predetermined gases at about atmospheric pressure, and a radiation-transmitting window means located proximate one end of said sealed primary envelope means;

spaced high voltage electrodes positioned within said primary envelope means and generally paralleling one another at a predetermiend distance about said optical axis of said primary envelope means, and said electrodes operable to produce therebetween an electric discharge, said electric discharge further producing a substantial number of lasing transitions, said lasing transitions having different optical gains which are characteristic of said discharge produced in said predetermiend gaseous mixture;

a first reflective means of predetermined relatively small peripheral diameter positioned upon said optical axis of said primary envelope means and at a location proximate the ends of said electrodes which are located nearest said window means, said first reflective means having a predetermined radius of curvature, a second reflective means of predetermined large diameter relative to said first reflective means, said second reflective having a predetermined radius of curvature, said second reflective means positioned on said optical axis of said primary envelope means and at a position proximate the ends of said electrodes which are located remote from said window means, an aperture of predetermined diameter provided through said second reflective means and coincident with said optical axis of said primary envelope means, and said first and said second reflective means operable to reflect said lasing transitions comprising said electric discharge;

gain cell means enclosed within said primary envelope means, said gain cell means comprising a relatively small elongated envelope which is aligned with said optical axis of said primary envelope means and is positioned on the opposite side of said second reflective means from said spaced electrodes, said gain cell means enclosing the same predetermined atmosphere as said primary envelope means but at a predetermined low pressure, hollow spaced electrodes positioned proximate the ends of said relatively small elongated envelope means operable to produce a low pressure gain cell electric discharge, said small elongated envelope including radiation-transmitting window means at the ends thereof, and said gain cell means operating as a selective filter to pass only a predetermiend limited portion of said lasing transitions; and, a reflecting means within said primary envelope means and aligned with said optical axis of said primary envelope means and said gain cell means and positioned on the opposite side of said gain cell means from said second reflective means (producing a multiplicity of resonator modes), said reflecting means operable to receive and reflect said lasing transitions which pass through said gain cell means, and said lasing transitions reflected from said reflecting means and then passing again through said gain cell means and then through said aperature in said second reflective means and thence through said electric discharge in said primary envelope means where lasing transitions and said resonator modes passed by said gain cell means are amplified by multiple reflections between said first and said second reflective means to form a laser beam comprising a discrete lasing transition and discrete resonator mode which are all ultimately passed about the periphery of said first reflective means and through said window means out of said primary envelope means.

2. A laser-energy-generating apparatus as in claim 1, where said reflecting means is also a tuning means, operable to reflect a predetermined lasing transition only through said gain cell means and said aperture of said second reflective means.

3. The laser-energy-generating apparatus as in claim 2, where said tuning means operable to reflect a portion of said predetermined lasing transition is a selectively scored concave mirror.

4. The laser-energy-generating apparatus as in claim 2, where said tuning means operable to reflect an amount of predetermined lasing transitions is an acousto-optic filter.

5. A laser-energy-generating apparatus as in claim 1, where said first reflective means is a convex mirror with a predetermined radius of curvature.

6. A laser-energy-generating apparatus as in claim 1, where said second reflective means is a concave mirror with a predetermined radius of curvature.

7. A laser-energy-generating apparatus as in claim 1, where said reflecting means is a concave mirror with a predetermined radius of curvature.

8. The laser-energy-generating apparatus as in claim 1, where said predetermined gaseous mixture comprising carbon dioxide and further comprises predetermined proportions of nitrogen and helium.

9. The laser-energy-generating apparatus of claim 1, where said window means principally comprises sodium chloride.

10. The laser-energy-generating apparatus as in claim 1, where said low pressure gain cell window means principally comprises zinc selenide.

* * * * *